J. G. GOODHUE.
DISINFECTING APPARATUS OR THE LIKE.
APPLICATION FILED JUNE 8, 1914. RENEWED JUNE 29, 1918.
1,293,408.
Patented Feb. 4, 1919.
2 SHEETS—SHEET 2.
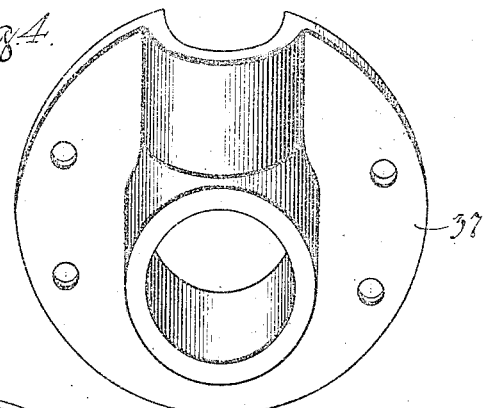
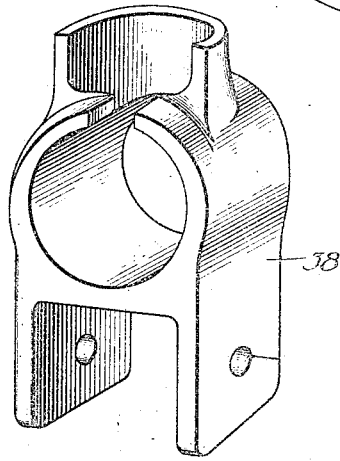
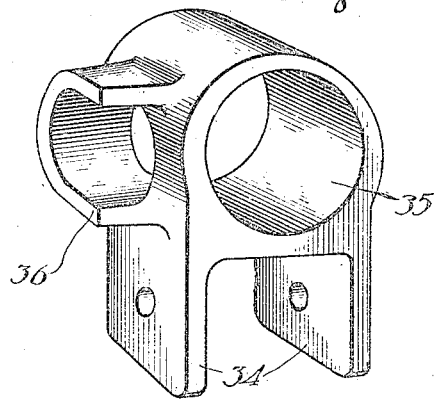
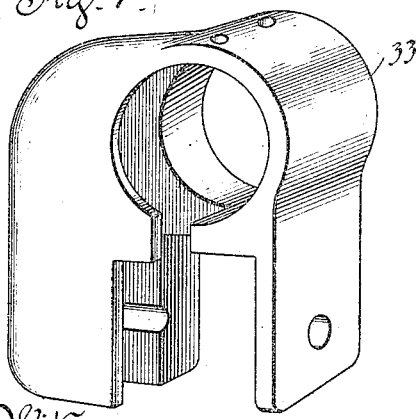
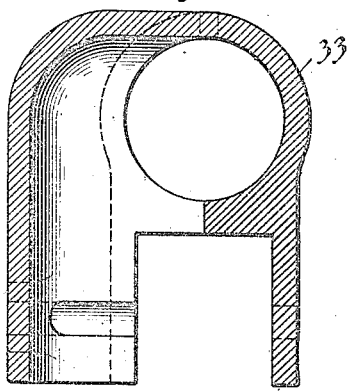
Witnesses:
Inventor:
Julian G. Goodhue.

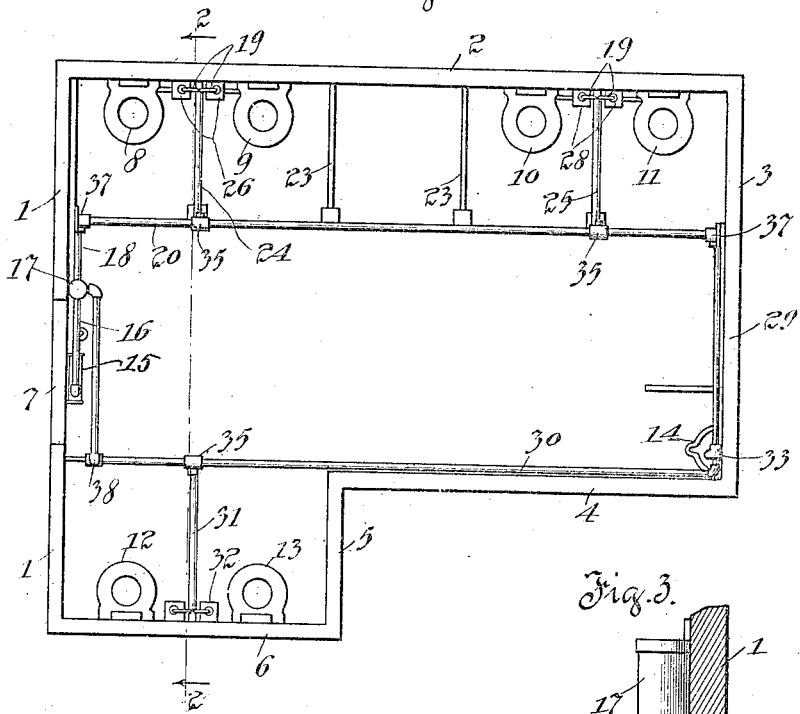
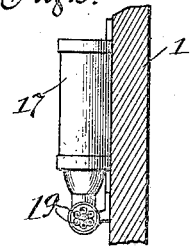
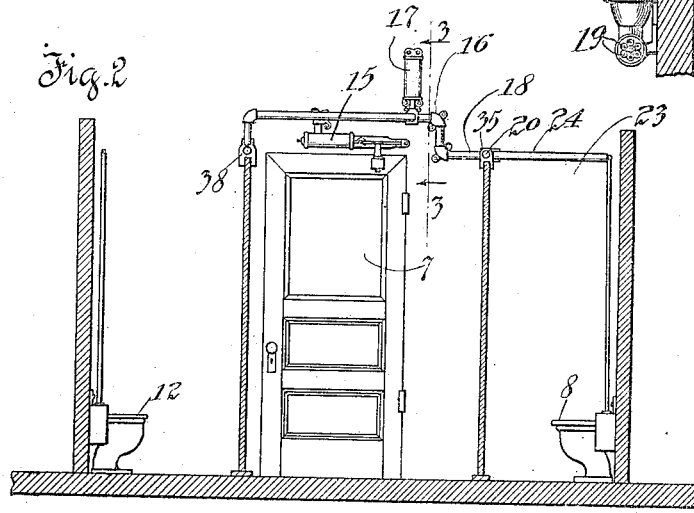

UNITED STATES PATENT OFFICE.

JULIAN G. GOODHUE, OF CHICAGO, ILLINOIS.

DISINFECTING APPARATUS OR THE LIKE.

1,293,408. Specification of Letters Patent. Patented Feb. 4, 1919.

Application filed June 8, 1914, Serial No. 843,748. Renewed June 29, 1918. Serial No. 242,670.

*To all whom it may concern:*

Be it known that I, JULIAN G. GOODHUE, a citizen of the United States, residing at Chicago, in the county of Cook and State of Illinois, have invented a certain new and useful Improvement in Disinfecting Apparatus or the like, of which the following is a full, clear, concise, and exact description, reference being had to the accompanying drawings, forming a part of this specification.

My invention relates to disinfecting apparatus or the like, and especially to apparatus in which connections are made between different parts of the apparatus in different parts of a room, compartment or building.

Prominent objects of the invention are to arrange for the economic installation of the apparatus; to permit the running of pipes or other connections without extra expense for conduits or coverings therefor; to arrange for easy and ready connection with the pipes or connections, and to accomplish the foregoing and other desirable results in a simple and practical manner.

In carrying out my invention in the manner herein set forth I extend the pipes or connections of a disinfecting system or other apparatus through the tubular supports frequently employed in a building, room or compartment, for connecting or supporting different walls or partitions, and I thereby make it unnecessary to provide separate and additional conduits or tubular members for such pipes or connections. Furthermore, I arrange to tap off or connect with the pipes or connections located in said tubular supports at convenient or desirable places and for such purpose employ specially designed and constructed fittings adapted to serve both as brackets for the tubular members or supports, and also as outlets for the pipes or connections confined within the same.

In this application I show my invention applied to a disinfecting system employed in connection with a lavatory and the bowls thereof, but it will be understood that the invention is capable of other uses and applications.

In the accompanying drawings Fig. 1 is a plan of a lavatory room provided with a number of bowls and also with a disinfecting system embodying my invention;

Fig. 2 is a vertical elevation taken on line 2—2 in Fig. 1;

Fig. 3 is a cross section taken on line 3—3 in Fig. 2;

Figs. 4, 5, 6, 7 and 8 are views of different fittings or brackets particularly adapted for use in connection with the invention.

Referring to Figs. 1, 2 and 3, I show a room having walls 1, 2, 3, 4, 5 and 6, and a door 7 in the wall 1. The room is provided with lavatory bowls 8, 9, 10, 11, 12, 13 and 14. A disinfecting apparatus adapted to spray or disinfect said bowls is illustrated, the same being set forth and claimed in various applications for patents heretofore filed by me. The apparatus in a general way comprises a door check 15 mounted above and arranged to be operated by the door 7. A tube 16 runs from the check 15 to a distributing device 17 by which air from the door check 15 passing through the tube 16 may be distributed to a plurality of different tubes or pipes which are confined within a cylindric tube or pipe 18, the several smaller tubes or pipes 19 being shown more especially in Fig. 3. Inasmuch as the apparatus thus described and especially the distributing member 17 are fully set forth in my application Serial No. 697,553, filed May 15, 1912, and further as they form no part of my present invention they will not be described in detail herein. The tube 18 extends to a tubular element or member 20 which extends lengthwise of the room as best shown in Fig. 1. This member 20 may be the tubular support which is employed as a support or retaining member to hold the partitions 23—23 between the bowls 8, 9, 10 and 11 in their proper upright position. This tubular member 20 is usually built in when the room and its contents are built and finished, and in such case the arrangement herein set forth may be either built in when the room is being constructed and finished, or subsequently. The tube 18 being connected with the tubular member 20, the small pipes or tubes 19 are extended from the tube 18 into and along within the tubular member 20. A tubular member 24 is shown extending from the tubular member 20 between the bowls 8 and 9, and another tubular member 25 extending between the bowls 10 and 11. Small tubes or pipes are understood to be led off from the set of tubes or pipes within the member 20 out through the member 25 and to bowls or jars 26, 26, which are understood to form a part of the disinfecting apparatus for the bowls 8 and 9. In a similar way other tubes 19 are extended through a tube 25 to jars 28 forming parts of the disinfecting apparatus for the bowls 10 and 11. The tubular members 24 and 25 may be members built in as part of the supporting framework or structure, or they may be special tubes added particularly for the disinfecting system, as the case may be. In a similar way I show a tubular member 29 extended across the end wall 3 of the room, and another tubular member 30 extended along the side 4 thereof. The member 30 at least is usually part of the frame construction to connect and support the partition between the bowls 12 and 13. The pipes 19 are extended through the members 29 and 30, one pipe 19 being let off for the bowl 14 and other pipes being let off and extended through the tubular member 31 for the bowls 12 and 13 running to the jars 32—32 therefor.

In order to permit proper connection with the tubular members 20, 29 and 30, and permit the pipes 19 to be led therefrom I provide special brackets or fittings. In Fig. 6 I show a fitting 33, especially adapted to connect members 20 and 24. This fitting involves downwardly extending side portions 34—34 adapted to fit on opposite sides of the partition or wall portion, usually a marble slab, running parallel with the back wall 2. A tubular bore 35 is adapted to receive the tubular member 20 and a side outlet 36 is adapted for connection with the cross member 24. The bracket 37 shown in Fig. 4 is intended for use in supporting a tubular member on a cross wall. The bracket 38 shown in Fig. 5 is intended for use upon the top of a wall portion where branch pipes are to be extended upwardly. The device 39 of Figs. 7 and 8 is intended for use for branch pipes extending downwardly. It will be seen that these devices are adapted for connection to the wall portions or partitions, and adapted to also serve as supports or brackets for tubular members holding said partitions in place, and also adapted to permit the leading out of small pipes from within said supporting tubular members.

By use of the tubular supports in connection with partitions or wall sections it will be seen that the small pipes or connections for the apparatus may be inclosed in conduits without the extra expense of providing such conduits, and that in this way great saving in the cost of installing the apparatus is made.

It will be understood that changes and modifications may be made without departing from the spirit of the invention.

What I claim is:

1. The combination with wall portions or partitions and tubular members engaging and supporting the same, of connections for disinfecting apparatus confined and extended within said supporting members.

2. The combination of lavatory bowls, partitions between the same, tubular supports for said partitions, disinfecting apparatus for the bowls, and connections for said apparatus extended within said tubular supports.

3. The combination of lavatory bowls, partitions between the same, tubular supports for said partitions, disinfecting apparatus for the bowls, and connections for said apparatus extended within said tubular supports, and fittings for supporting said tubular supports and permitting the leading out of connections therefrom.

4. The combination of disinfecting apparatus, means for actuating said apparatus, partitions separating said apparatus, tubular connections leading from said actuating mechanism to said disinfecting apparatus, said connections extending parallel and transversely to said partitions and forming supports for the same.

5. The combination with wall portions or partitions, of a tubular member extending transversely to the wall portions and forming a support therefor, said tubular member forming a connection for disinfecting apparatus confined between said portions.

6. In combination, tubular wall supporting members, disinfecting apparatus mounted between the walls and connections leading from said tubular wall supporting members to the disinfecting apparatus.

7. The combination of disinfecting apparatus, means for actuating said apparatus, partitions separting said apparatus and tubular connections leading from said actuating mechanism to said disinfecting apparatus and forming supports for said partitions.

8. The combination of partitions, of tubular members connecting and supporting said partitions, and leading to instrumentalities between the partitions.

9. The combination of partitions, of disinfecting apparatus positioned between said partitions, tubular members connected to said disinfecting apparatus and connecting and supporting said partitions.

In witness whereof, I hereunto subscribe my name this 27th day of April, A. D., 1914.

JULIAN G. GOODHUE.

Witnesses:
A. LYDA JONES,
H. A. JONES.